(12) United States Patent
Bahn et al.

(10) Patent No.: US 10,907,040 B2
(45) Date of Patent: Feb. 2, 2021

(54) POLYCARBONATE COMPOSITION AND ARTICLE COMPRISING SAME

(71) Applicant: LG CHEM, LTD., Seoul (KR)

(72) Inventors: Hyong Min Bahn, Daejeon (KR); Young Young Hwang, Daejeon (KR); Moo Ho Hong, Daejeon (KR); Jung Jun Park, Daejeon (KR); Ki Jae Lee, Daejeon (KR)

(73) Assignee: LG CHEM LTD., Seoul (KR)

( * ) Notice: Subject to any disclaimer, the term of this patent is extended or adjusted under 35 U.S.C. 154(b) by 86 days.

(21) Appl. No.: 16/315,578

(22) PCT Filed: Oct. 17, 2017

(86) PCT No.: PCT/KR2017/011480
§ 371 (c)(1),
(2) Date: Jan. 4, 2019

(87) PCT Pub. No.: WO2018/084461
PCT Pub. Date: May 11, 2018

(65) Prior Publication Data
US 2019/0330466 A1    Oct. 31, 2019

(30) Foreign Application Priority Data
Nov. 1, 2016  (KR) .................. 10-2016-0144602

(51) Int. Cl.
*C08L 69/00*    (2006.01)

(52) U.S. Cl.
CPC ........... *C08L 69/00* (2013.01); *C08L 2201/02* (2013.01); *C08L 2205/025* (2013.01); *C08L 2205/03* (2013.01)

(58) Field of Classification Search
CPC ............... C08L 69/00; C08L 2201/02; C08L 2205/025; C08L 225/03
USPC ......................................................... 524/117
See application file for complete search history.

(56) References Cited

U.S. PATENT DOCUMENTS

| 6,187,896 | B1 | 2/2001 | Nakajima et al. |
| 6,342,550 | B1 | 1/2002 | Ishii et al. |
| 8,101,678 | B2 | 1/2012 | Roth |
| 8,927,661 | B2 | 1/2015 | Li et al. |
| 9,540,511 | B2 | 1/2017 | Aoki |
| 9,809,677 | B2 | 11/2017 | Park et al. |
| 2011/0071241 | A1 | 3/2011 | Rogunova et al. |
| 2015/0011688 | A1 | 1/2015 | An et al. |
| 2016/0122534 | A1* | 5/2016 | Zhou ............ C08L 69/00 524/151 |
| 2016/0326321 | A1* | 11/2016 | Park ............. C08L 51/04 |
| 2017/0292019 | A1 | 10/2017 | Lee et al. |

FOREIGN PATENT DOCUMENTS

| CN | 102482484 A | 5/2012 |
| CN | 105283507 A | 1/2016 |
| CN | 105694414 A | 6/2016 |
| CN | 105838052 A | 8/2016 |
| CN | 105899610 A | 8/2016 |
| EP | 0524731 B1 | 1/1993 |
| EP | 1548065 B1 | 6/2005 |
| EP | 3050908 A1 | 8/2016 |
| JP | 8-32820 B2 | 3/1996 |
| JP | 08-302178 A | 11/1996 |
| JP | 2000-239514 A | 9/2000 |
| JP | 2000-290487 A | 10/2000 |
| JP | 5902409 B2 | 4/2016 |
| KR | 10-2012-0074281 A | 7/2012 |
| KR | 10-1510407 A | 4/2015 |
| KR | 10-2016-0030126 A | 3/2016 |
| KR | 10-2016-0067786 A | 6/2016 |
| WO | 2014136879 A1 | 9/2014 |
| WO | 2014/201224 A1 | 12/2014 |
| WO | 2016/089168 A1 | 6/2016 |
| WO | 2016-170468 A1 | 10/2016 |

* cited by examiner

*Primary Examiner* — Kelechi C Egwim
(74) *Attorney, Agent, or Firm* — Dentons US LLP

(57) ABSTRACT

The present invention relates to a polycarbonate composition and an article including the same. The polycarbonate composition according to the present invention includes a copolycarbonate having a specific siloxane structure and a branched or non-branched polycarbonate, and simultaneously uses a flame retardant and an organophosphorus compound, thereby being able to exhibit excellent flame retardancy and impact strength and also to maintain the impact strength even under high temperature and high humidity conditions for a long period of time.

20 Claims, No Drawings

POLYCARBONATE COMPOSITION AND ARTICLE COMPRISING SAME

CROSS-REFERENCE TO RELATED APPLICATION(S)

This application is a National Stage Entry of International Application No. PCT/KR2017/011480, filed on Oct. 17, 2017, and claims the benefit of and priority to Korean Application No. 10-2016-0144602, filed on Nov. 1, 2016, all of which are hereby incorporated by reference in their entirety for all purposes as if fully set forth herein.

TECHNICAL FIELD

The present invention relates to a polycarbonate composition having excellent flame retardancy and impact strength and also maintaining the impact strength even under high temperature and high humidity conditions for a long period of time, and an article including the same.

BACKGROUND OF ART

Polycarbonate resins are prepared by condensation-polymerization of an aromatic diol such as bisphenol A with a carbonate precursor such as phosgene, and have excellent impact strength, dimensional stability, heat resistance, transparency and the like. Thus, the polycarbonate resins have applications in a wide range, such as for exterior materials for electrical and electronic products, automobile components, building materials, and optical components.

Recently, in order to apply these polycarbonate resins to more various fields, many studies have been made to obtain desired physical properties by copolymerizing two or more aromatic diol compounds having different structures from each other and introducing monomers having different structures into a main chain of the polycarbonate.

In particular, studies for introducing a polysiloxane structure in a main chain of the polycarbonate have been undertaken. However, most of these technologies have disadvantages in that the production cost is high, and flame retardancy and impact strength are deteriorated.

As a result, the present inventors found that a polycarbonate composition which simultaneously includes a copolycarbonate containing a specific siloxane structure and a polycarbonate not containing a siloxane structure, and additionally includes at least one flame retardant selected from the group consisting of a sulfonate-based metal salt and a polyorganosiloxane, and an organophosphorus compound, have improved flame retardancy and impact strength and also maintain such impact strength even under high temperature and high humidity conditions for a long time, thereby completing the present invention.

DETAILED DESCRIPTION OF THE INVENTION

Technical Problem

It is one object of the present invention to provide a polycarbonate composition having excellent flame retardancy and impact strength, and also maintaining the impact strength even under high temperature and high humidity conditions for a long period of time.

It is another object of the present invention to provide an article including the above-described polycarbonate composition.

Technical Solution

In order to achieve the above objects, the present invention provides a polycarbonate composition including:

(a) a copolycarbonate containing an aromatic polycarbonate-based first repeating unit and an aromatic polycarbonate-based second repeating unit having at least one siloxane bond;

(b) at least one polycarbonate selected from the group consisting of a non-branched polycarbonate containing an aromatic polycarbonate-based first repeating unit, and a branched polycarbonate containing an aromatic polycarbonate-based first repeating unit and a trivalent or tetravalent branched repeating unit which links a plurality of the first repeating units;

(c) at least one flame retardant selected from the group consisting of a sulfonate-based metal salt and a polyorganosiloxane; and (d) an organophosphorus compound.

Herein, the first repeating units each independently include a repeating unit represented by the following Chemical Formula 1, and the second repeating unit includes a repeating unit represented by the following Chemical Formula 2, and a repeating unit represented by the following Chemical Formula 3.

[Chemical Formula 1]

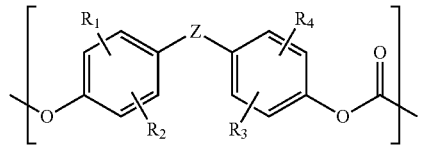

In Chemical Formula 1, $R_1$ to $R_4$ are each independently hydrogen, a $C_{1-10}$ alkyl, a $C_{1-10}$ alkoxy, or a halogen, and Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

[Chemical Formula 2]

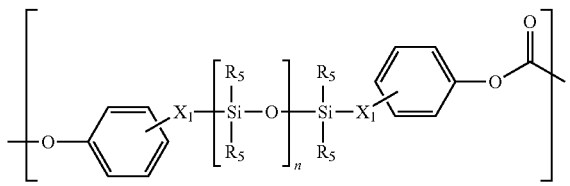

In Chemical Formula 2, each $X_1$ is independently a $C_{1-10}$ alkylene, each $R_5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and n is an integer of 1 to 200.

[Chemical Formula 3]

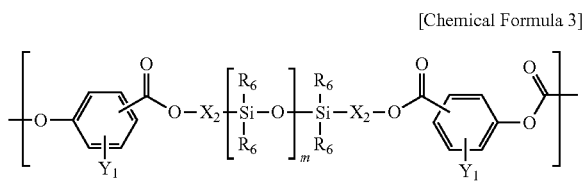

In Chemical Formula 3, each $X_2$ is independently a $C_{1-10}$ alkylene, each $Y_1$ is independently hydrogen, a $C_{1-6}$ alkyl, a halogen, a hydroxy, a $C_{1-6}$ alkoxy, or a $C_{6-20}$ aryl, each $R_6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and m is an integer of 1 to 200.

Polycarbonate resin is excellent in transparency, impact strength, dimensional stability, heat resistance, and the like, and thus has applications in a wide range, such as exterior materials for electrical and electronic products, automobile components, building materials, and optical components. However, the polycarbonate resin has poor flame retardancy and thus has a limitation in application to fields requiring flame retardancy such as exterior materials for electrical and electronic products, and automobile components.

Specifically, typical polycarbonate resins have poor flame retardancy of a V-2 rating as measured in accordance with the UL-94 V Test (Vertical Burning test) standard. Therefore, the addition of a flame retardant is essential for improving flame retardancy, but while the flame retardancy is improved by the addition of the flame retardant, there is a problem that physical properties inherent in the polycarbonate including impact strength are deteriorated.

Therefore, in the polycarbonate composition of the present invention, a copolycarbonate in which a polysiloxane structure is introduced in the main chain of the polycarbonate and a polycarbonate in which a polysiloxane structure is not introduced in the main chain are used together, and a flame retardant selected from a sulfonate-based metal salt and a polyorganosiloxane, and an organophosphorus compound, are simultaneously added. As a result, it has been found that the flame retardancy of the polycarbonate composition is increased to a UL-94 V-O rating, excellent impact strength is imparted, and also such impact strength can be maintained under high temperature and high humidity conditions.

Hereinafter, the present invention will be described in more detail.

Copolycarbonate (a)

The 'copolycarbonate' according to the present invention means a copolymer which simultaneously includes a polycarbonate-based repeating unit in which a polysiloxane structure is not introduced in the main chain, and a polycarbonate-based repeating unit in which a polysiloxane structure is introduced in the main chain.

The copolycarbonate simultaneously includes a first repeating unit having no siloxane bond represented by Chemical Formula 1, and a second repeating unit having at least one siloxane bond containing repeating units represented by Chemical Formulae 2 and 3.

In this case, the molar ratio between the aromatic polycarbonate-based first repeating unit and the aromatic polycarbonate-based second repeating unit having at least one siloxane bond is preferably 1:0.004-0.006, and the weight ratio is preferably 1:0.04-0.07.

Specifically, the repeating unit represented by Chemical Formula 1 is formed by reacting an aromatic diol compound and a carbonate precursor.

In Chemical Formula 1, preferably, $R_1$ to $R_4$ are each independently hydrogen, methyl, chloro, or bromo.

In addition, preferably, Z is a linear or branched $C_{1-10}$ alkylene unsubstituted or substituted with a phenyl, and more preferably, methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis (4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, and bis(4-hydroxyphenyl)diphenylmethane.

The term 'derived from aromatic diol compounds' as used herein means that a hydroxy group of the aromatic diol compound and the carbonate precursor are reacted to form the repeating unit represented by Chemical Formula 1.

For example, when bisphenol A, which is an aromatic diol compound, and triphosgene, which is a carbonate precursor, are polymerized, the first repeating unit represented by Chemical Formula 1 is represented by the following Chemical Formula 1-1.

[Chemical Formula 1-1]

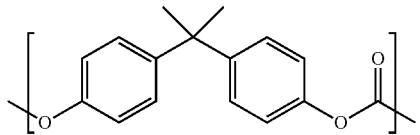

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromo phosgene, and bishaloformate may be used. Preferably, triphosgene or phosgene may be used.

Further, in Chemical Formula 2, preferably, each $X_1$ is independently a $C_{2-10}$ alkylene, more preferably a $C_{2-4}$ alkylene, and most preferably propane-1,3-diyl.

Further, preferably, each $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each $R_5$ is independently a $C_{1-10}$ alkyl, more preferably a $C_{1-6}$ alkyl, still more preferably a $C_{1-3}$ alkyl, and most preferably methyl.

Further, preferably, the n is an integer of 10 to 50. More preferably, the n is an integer of 10 or more, 15 or more, 20 or more, 25 or more, 30 or more, 31 or more, or 32 or more, and 50 or less, 45 or less, 40 or less, 39 or less, 38 or less, 37 or less, or 35 or less.

In Chemical Formula 3, preferably, each $X_2$ is independently a $C_{2-10}$ alkylene, more preferably a $C_{2-6}$ alkylene, and most preferably isobutylene.

Further, preferably, $Y_1$ is hydrogen.

Further, preferably, each $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, propoxy, allyl, 2,2,2-trifluoroethyl, 3,3,3-trifluoropropyl, phenyl, or naphthyl. Further, preferably, each $R_6$ is independently a $C_{1-10}$ alkyl, more preferably a $C_{1-6}$ alkyl, still more preferably a $C_{1-3}$ alkyl, and most preferably methyl.

Preferably, the m is an integer of 40 to 100. More preferably, the m is an integer of 40 or more, 45 or more, 50 or more, 55 or more, 56 or more, 57 or more, or 58 or more, and 100 or less, 80 or less, 75 or less, 70 or less, 65 or less, 64 or less, 63 or less, or 62 or less.

The repeating unit represented by Chemical Formula 2 and the repeating unit represented by Chemical Formula 3 are derived from a siloxane compound represented by the following Chemical Formula 2-1 and a siloxane compound represented by the following Chemical Formula 3-1, respectively.

[Chemical Formula 2-1]

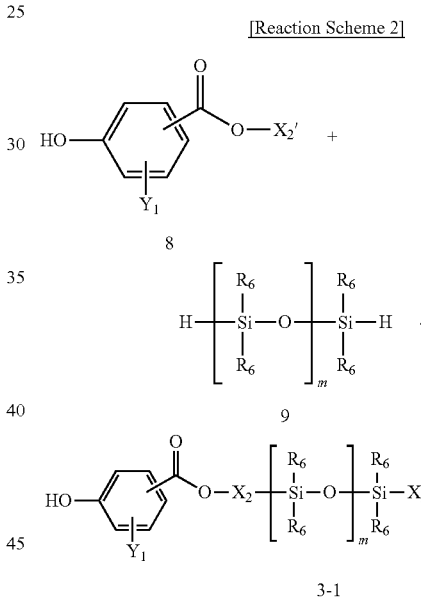

In Chemical Formula 2-1, $X_1$, $R_5$, and n are the same as previously defined.

[Chemical Formula 3-1]

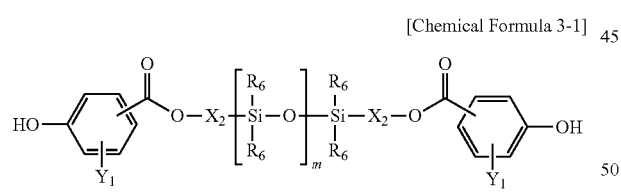

In Chemical Formula 3-1, $X_2$, $Y_1$, $R_6$, and m are the same as previously defined.

The term 'derived from a siloxane compound' means that a hydroxy group of each of the siloxane compounds and a carbonate precursor are reacted to form the repeating unit represented by Chemical Formula 2 and the repeating unit represented by the Chemical Formula 3, respectively. Further, descriptions of the carbonate precursors that may be used for the formation of the repeating units represented by Chemical Formulae 2 and 3 are the same as those described for the carbonate precursor that may be used for the formation of the repeating unit represented by Chemical Formula 1 described above.

The methods for preparing the siloxane compound represented by Chemical Formula 2-1 and the siloxane compound represented by Chemical Formula 3-1 are shown in the following Reaction Schemes 1 and 2, respectively.

[Reaction Scheme 1]

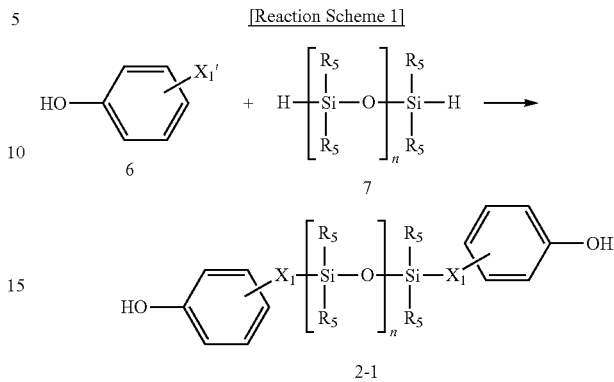

In Reaction Scheme 1,
$X_1'$ is a $C_{2-10}$ alkenyl, and
$X_1$, $R_5$, and n are the same as previously defined.

[Reaction Scheme 2]

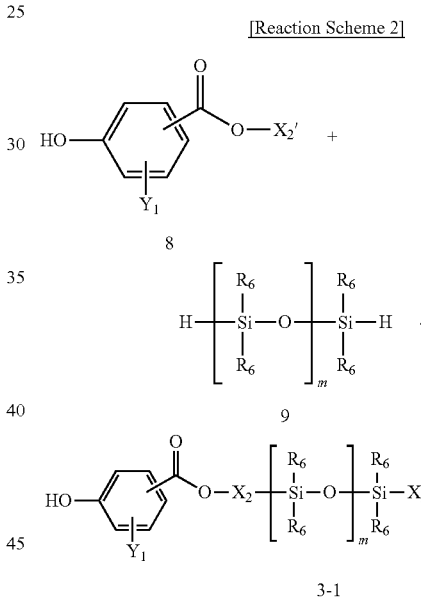

In Reaction Scheme 2,
$X_2'$ is a $C_{2-10}$ alkenyl, and
$X_2$, $Y_1$, $R_6$, and m are the same as previously defined.

The reactions of Reaction Schemes 1 and 2 are preferably carried out under a metal catalyst. As the metal catalyst, it is preferable to use a Pt catalyst. As the Pt catalyst, at least one selected from the group consisting of an Ashby catalyst, a Karstedt catalyst, a Lamoreaux catalyst, a Speier catalyst, $PtCl_2(COD)$, $PtCl_2(benzonitrile)_2$, and $H_2PtBr_6$ can be used. The metal catalyst may be used in an amount of 0.001 parts by weight or more, 0.005 parts by weight or more, or 0.01 parts by weight or more, and 1 part by weight or less, 0.1 parts by weight or less, or 0.05 parts by weight or less, based on 100 parts by weight of the compound represented by Chemical Formula 7 or 9.

The reaction temperature is preferably 80 to 100° C. Further, the reaction time is preferably 1 hour to 5 hours.

In addition, the compound represented by Chemical Formula 7 or 9 can be prepared by reacting an organodisiloxane with an organocyclosiloxane in the presence of an acid catalyst, and the content of the reaction material can be adjusted to control n and m. The reaction temperature is preferably 50 to 70° C. Further, the reaction time is preferably 1 hour to 6 hours.

As the organodisiloxane, at least one selected from the group consisting of tetramethyldisiloxane, tetraphenyldisiloxane, hexamethyldisiloxane, and hexaphenyldisiloxane can be used. Further, as the organocyclosiloxane, organocyclotetrasiloxane may be used as an example, and a specific example thereof may include octamethylcyclotetrasiloxane, octaphenylcyclotetrasiloxane, and the like.

The organodisiloxane may be used in an amount of 0.1 parts by weight or more, or 2 parts by weight or more, and 10 parts by weight or less, or 8 parts by weight or less, based on 100 parts by weight of the organocyclosiloxane.

As the acid catalyst, at least one selected from the group consisting of $H_2SO_4$, $HClO_4$, $AlCl_3$, $SbCl_5$, $SnCl_4$, and acidic white clay can be used. Further, the acid catalyst may be used in an amount of 0.1 parts by weight or more, 0.5 parts by weight or more, or 1 part by weight or more, and 10 parts by weight or less, 5 parts by weight or less, or 3 parts by weight or less, based on 100 parts by weight of the organocyclosiloxane.

In particular, the content of the repeating unit represented by Chemical Formula 2 and the repeating unit represented by Chemical Formula 3 can be controlled, thereby simultaneously improving low-temperature impact strength and YI (Yellow Index) of the copolycarbonate. The weight ratio between the repeating units may be 1:99 to 99:1. It is preferably 3:97 to 97:3, 5:95 to 95:5, 10:90 to 90:10, or 15:85 to 85:15, and more preferably 20:80 to 80:20. The weight ratio of the repeating units corresponds to the weight ratio of the siloxane compounds, for example, the siloxane compound represented by Chemical Formula 2-1 and the siloxane compound represented by Chemical Formula 3-1.

Preferably, the repeating unit represented by Chemical Formula 2 is represented by the following Chemical Formula 2-2.

[Chemical Formula 2-2]

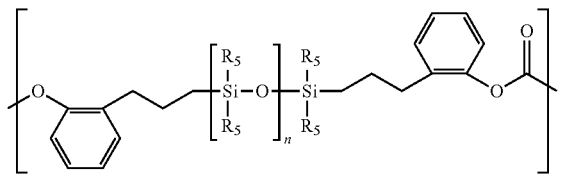

In Chemical Formula 2-2, $R_5$ and n are the same as previously defined. Preferably, $R_5$ is methyl.

Further, preferably, the repeating unit represented by Chemical Formula 3 is represented by the following Chemical Formula 3-2.

In Chemical Formula 3-2, $R_6$ and m are the same as previously defined. Preferably, $R_6$ is methyl.

Preferably; the weight ratio between the weight of the repeating unit represented by Chemical Formula 1, and the total weight of the repeating unit represented by Chemical Formula 2 and the repeating unit represented by Chemical Formula 3 (Chemical Formula 1:(Chemical Formula 2 Chemical Formula 3)), is 1:0.001 to 1:02, and more preferably 1:0.01 to 1:0.1. The weight ratio of the repeating units corresponds to the weight ratio of the aromatic diol compound used for the formation of the repeating unit of Chemical Formula 1 and the siloxane compound used for the formation of the repeating units of Formulae 2 and 3.

Further, preferably, the copolycarbonate has a weight average molecular weight of 1000 to 100,000 g/mol, and more preferably 15,000 to 35,000 g/mol. More preferably, the weight average molecular weight (g/mol) is 23,000 or more, 24,000 or more, or 25,000 or more. Further, the weight average molecular weight is 34,000 or less, 33,000 or less, or 32,000 or less.

On the other hand, the copolycarbonate can be prepared, for example, by polymerizing the aromatic diol compound, the siloxane compounds represented by Chemical Formulae 2-1 and 3-1, and the carbonate precursor.

During the polymerization, the siloxane compound may be used in an amount of 0.1% by weight or more, 0.5% by weight or more, 1% by weight or more, 1.5% by weight or more, 2.0% by weight or more, 2.5% by weight or more, or 3.0% by weight or more, and 20% by weight or less, 10% by weight or less, 7% by weight or less, 5% by weight or less, or 4% by weight or less, based on 100% by weight of the total of the aromatic diol compound, the carbonate precursor, and one or more siloxane compounds.

In addition, the aromatic diol compound can be used in an amount of 40% by weight or more, 50% by weight or more, or 55% by weight or more, and 80% by weight or less, 70% by weight or less, or 65% by weight or less, based on 100% by weight of the total of the aromatic diol compound, the carbonate precursor, and one or more siloxane compounds.

Further, the carbonate precursor can be used in an amount of 10% by weight or more, 20% by weight or more, or 30% by weight or more, and 60% by weight or less, 50% by weight or less, or 40% by weight or less, based on 100% by weight of the total of the aromatic dial compound, the carbonate precursor and one or more siloxane compounds.

Further, as the polymerization method, an interfacial polymerization method can be used, as an example. In this case, there is an advantage in that the polymerization reaction can be conducted at a low temperature and atmospheric pressure and it is easy to adjust the molecular weight. The interfacial polymerization is preferably conducted in the presence of an acid binder and an organic solvent. Furthermore, the interfacial polymerization may include, for example, the steps of conducting prepolymerization, then adding a coupling agent thereto and again conducting

[Chemical Formula 3-2]

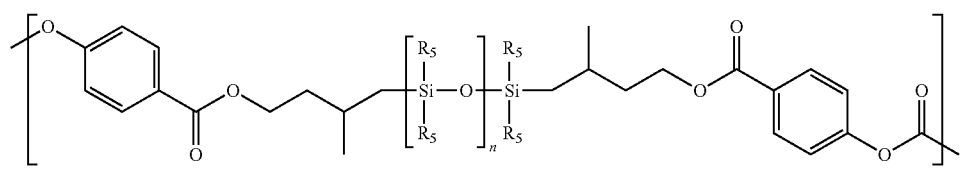

polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, a halogenated hydrocarbon such as methylene chloride or chlorobenzene can be used.

Further, during the interfacial polymerization, a reaction accelerator, for example, a tertiary amine compound such as triethylamine, tetra-n-butyl ammonium bromide, and tetra-n-butylphosphonium bromide, or a quaternary ammonium compound or a quaternary phosphonium compound, may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the molecular weight modifier, mono-alkylphenol may be used. As an example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol, and triacontyl phenol, and preferably p-tert-butylphenol. In this case, the effect of adjusting the molecular weight is great.

The molecular weight modifier is contained, for example, in an amount of 0.01 parts by weight or more, 0.1 parts by weight or more, or 1 part by weight or more, and 10 parts by weight or less, 6 parts by weight or less, or 5 parts by weight or less, based on 100 parts by weight of the aromatic diol compound. Within this range, the desired molecular weight can be obtained.

Polycarbonate (b)

The term 'polycarbonate' according to the present invention means a polymer containing a polycarbonate-based repeating unit. Specifically, at least one is selected from the group consisting of a non-branched polycarbonate and a branched polycarbonate, and is distinguished from the copolycarbonate (a) in that a polysiloxane structure is not introduced in the main chain of the polycarbonate. Also, the non-branched polycarbonate is distinguished from the branched polycarbonate in that it does not contain a branched repeating unit described below.

First, the non-branched polycarbonate includes a first repeating unit having no siloxane bond represented by Chemical Formula 1. For example, the non-branched polycarbonate may be composed of a first repeating unit having no siloxane bond represented by Chemical Formula 1 described above.

The description of the first repeating unit is the same as described above.

For example, when bisphenol A, which is an aromatic diol compound, and triphosgene, which is a carbonate precursor, are polymerized, the first repeating unit represented by Chemical Formula 1 is represented by the following Chemical Formula 1-1.

[Chemical Formula 1-1]

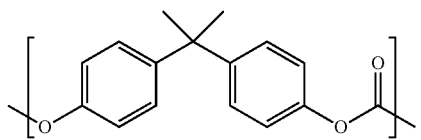

Preferably, the non-branched polycarbonate has a weight average molecular weight of 1000 to 100,000 g/mol, and preferably 15,000 to 35,000 g/mol. More preferably, the weight average molecular weight (g/mol) is 23,000 or more, 24,000 or more, or 25,000 or more. Further, the weight average molecular weight is 34,000 or less, 33,000 or less, or 32,000 or less.

The non-branched polycarbonate can be prepared by polymerizing the above-described aromatic diol compound and the carbonate precursor.

Further, as the polymerization method, an interfacial polymerization method can be used as an example, and for explanation of the interfacial polymerization, refer to those described above.

Next, the branched polycarbonate simultaneously includes a first repeating unit having no siloxane bond represented by Chemical Formula 1, and a trivalent or tetravalent branched repeating unit which links a plurality of the first repeating units, without having a siloxane bond.

In this case, the weight ratio between the first repeating unit represented by Chemical Formula 1 and the branched repeating unit may be 1:0.001 to 1:0.1. The weight ratio referred to above corresponds to a weight ratio of the aromatic diol compound and the aromatic polyhydric alcohol compound that are used for the formation of the repeating unit of Chemical Formula 1 and the branched repeating unit.

The description of the first repeating unit is the same as described above.

For example, when bisphenol A, which is an aromatic diol compound, and triphosgene, which is a carbonate precursor, are polymerized, the first repeating unit represented by Chemical Formula 1 is represented by the following Chemical Formula 1-1.

[Chemical Formula 1-1]

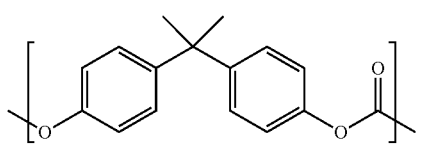

Moreover, the trivalent or tetravalent branched repeating unit may be a repeating unit represented by the following Chemical Formula 4.

[Chemical Formula 4]

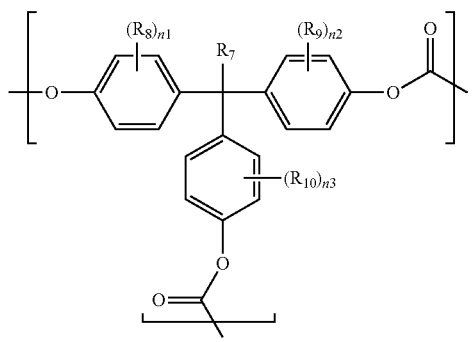

In Chemical Formula 4.

$R_7$ is hydrogen, or a $C_{1-10}$ alkyl, or

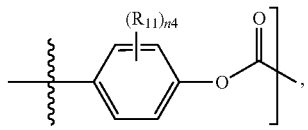

$R_6$ to $R_9$ are each independently hydrogen, a $C_{1-10}$ alkyl, a halogen, a $C_{1-10}$ alkoxy, an allyl, a $C_{1-10}$ haloalkyl, or a $C_{6-20}$ aryl, and n1 to n4 are each independently an integer of 1 to 4.

In Chemical Formula 4, preferably, $R_7$ is a $C_{1-6}$ alkyl, or

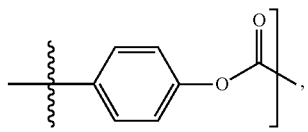

more preferably, a $C_{1-4}$ alkyl, and most preferably, methyl.

Further, preferably, $R_8$ to $R_{11}$ are each independently hydrogen, a $C_{1-6}$ alkyl, or a halogen, and more preferably hydrogen.

The repeating unit represented by Chemical Formula 4 is derived from an aromatic polyhydric alcohol compound represented by the following Chemical Formula 4-1.

[Chemical Formula 4-1]

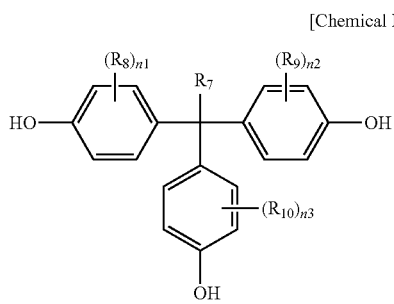

In Chemical Formula 4-1, $R_7$ is hydrogen, a $C_{1-10}$ alkyl, or

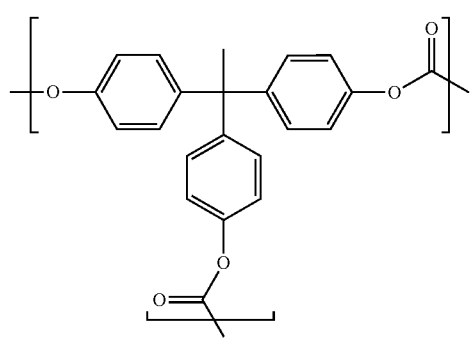

and $R_8$ to $R_{11}$ and n1 to n4 are the same as previously defined.

The term 'derived from aromatic polyhydric compound' means that a hydroxy group of the aromatic polyhydric compound and the carbonate precursor are reacted to form the repeating unit represented by Chemical Formula 4.

For example, when the aromatic polyhydric compound is THPE (1,1,1-tris(4-hydroxyphenyl)ethane) and it is polymerized with triphosgene, which is a carbonate precursor, the repeating unit represented by Chemical Formula 4 is represented by the following Chemical Formula 4-2.

[Chemical Formula 4-2]

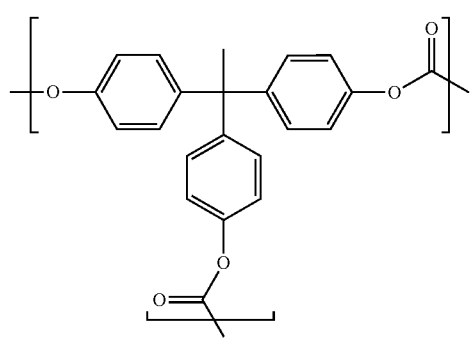

In another example, when an aromatic polyhydric alcohol compound is 4,4',4'',4'''-methanetetrayltetraphenol, and it is polymerized with triphosgene, which is a carbonate precursor, the repeating unit represented by Chemical Formula 4 is represented by the following Chemical Formula 4-3.

[Chemical Formula 4-3]

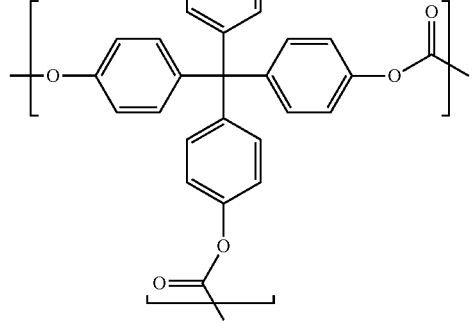

Descriptions of the carbonate precursors that may be used for the formation of the repeating unit of Chemical Formula 4 are the same as those described for the carbonate precursor that may be used for the formation of the repeating unit represented by Chemical Formula 1 described above.

The branched polycarbonate can be prepared by polymerizing the above-described aromatic diol compound, the aromatic polyhydric alcohol compound, and the carbonate precursor.

Further, as the polymerization method, an interfacial polymerization method can be used as an example, and for explanation of the interfacial polymerization, refer to those described above.

Further, preferably, the branched polycarbonate (a) has a weight average molecular weight of 1000 to 100,000 g/mol, and preferably 25,000 to 45,000 g/mol. More preferably, the weight average molecular weight (g/mol) is 26.000 or more, 27,000 or more, 28,000 or more, 29,000 or more, 30,000 or more, 31,000 or more, 32,000 or more, or 33,000 or more. Further, the weight average molecular weight is 44,000 or less, 43,000 or less, 42,000 or less, 41,000 or less, or 40,000 or less.

In the polycarbonate composition, the weight ratio of the copolycarbonate and the polycarbonate is from 1:99 to 99:1. More preferably, the weight ratio of the copolycarbonate and the polycarbonate may be from 50:50 to 95:5, from 50:50 to 90:10, from 55:45 to 90:10, from 60:40 to 90:10, from 65:35 to 90:10, from 70:30 to 90:10, or from 70:30 to 80:20.

Flame Retardant (C)

On the other hand, the copolycarbonate and the polycarbonate are relatively superior in mechanical properties, electrical properties, and weather resistance compared to other types of resins, but have poor flame retardancy. Thus, in order to be applied to various fields requiring flame retardancy, improvement of flame retardancy is required. In this regard, in the present invention, flame retardancy can be improved by adding at least one compound selected from the group consisting of a sulfonate-based metal salt and polyorganosiloxane to the polycarbonate composition.

Here, the term 'sulfonate-based metal salt' means a salt compound of an organic sulfonic acid ion and a metal ion, which results in an increase in the char formation rate of the polycarbonate, thereby contributing to the improvement of the flame retardancy of the polycarbonate composition. Also, the term 'polyorganosiloxane' means a silicone polymer to which a siloxane repeating unit substituted with an organic group is bonded, and the heat resistance and flame retardancy of the polycarbonate composition are improved by the repeated siloxane backbone.

Preferably, the polycarbonate composition may include at least two compounds selected from the group consisting of a sulfonate-based metal salt and a polyorganosiloxane.

For example, the polycarbonate composition may include two or more sulfonate-based metal salts. Alternatively, the polycarbonate composition may include two or more polyorganosiloxanes. As a further alternative, the polycarbonate composition may contain at least one sulfonate-based metal salt and at least one polyorganosiloxane at the same time.

The sulfonate-based metal salt may be a sulfonate alkali metal salt or a sulfonate alkaline earth metal salt.

For example, the sulfonate-based metal salt may be at least one compound selected from the group consisting of sodium trifluoromethyl sulfonate, sodium perfluoroethyl sulfonate, sodium perfluorobutyl sulfonate, sodium perfluoroheptyl sulfonate, sodium perfluorooctyl sulfonate, sodium trichlorobenzene sulfonate, sodium polystyrene sulfonate, potassium perfluorobutyl sulfonate, potassium perfluorohexyl sulfonate, potassium perfluorooctyl sulfonate, potassium diphenylsulfone sulfonate, calcium perfluoromethane sulfonate, rubidium perfluorobutyl sulfonate, rubidium perfluorohexyl sulfonate, cesium trifluoromethyl sulfonate, cesium perfluoroethyl sulfonate, cesium perfluorohexyl sulfonate, and cesium perfluorooctyl sulfonate.

Preferably, as the sulfonate-based metal salt, potassium perfluorobutyl sulfonate, potassium diphenylsulfone sulfonate, or a mixture thereof may be used.

In addition, the polyorganosiloxane may be a silicone polymer containing at least one substituent selected from the group consisting of alkyl, aryl, alkoxy, aryloxy, vinyl, (meth)acrylate, epoxy, mercapto, silanol, and amino.

Specifically, the polyorganosiloxane may be a silicone polymer in which the side chain or terminal of the siloxane repeating unit is substituted with an aryl group, and at least one reactive substituent selected from the group consisting of alkoxy, aryloxy, vinyl, (meth)acrylate, epoxy, mercapto, silanol, and amino.

Alternatively, the polyorganosiloxane may be a silicone polymer in which the side chain or terminal of the siloxane repeating unit is substituted with an alkyl group, and at least one reactive substituent selected from the group consisting of alkoxy, aryloxy, vinyl, (meth)acrylate, epoxy, mercapto, silanol, and amino.

Preferably, the polyorganosiloxane may be a silicone polymer whose side chain or terminal is substituted with an aryl group, an alkoxy group, and a vinyl group. More preferably, the polyorganosiloxane may be a siloxane compound in which the terminal is substituted with an alkoxy group and the side chain is substituted with an aryl group, an alkoxy group, and a vinyl group.

Herein, the alkyl may be a $C_{1-10}$ alkyl such as methyl, and the aryl may be a $C_{6-20}$ aryl such as phenyl. In addition, the alkoxy may be a $C_{1-10}$ alkoxy such as methoxy, ethoxy, n-propoxy, isopropoxy, n-butoxy, isobutoxy, sec-butoxy, or tert-butoxy, and specifically, it may be methoxy.

Further, preferably, the polyorganosiloxane is a silicone oligomer polymerized with up to five siloxane repeating units, and may have a weight average molecular weight of 100 to 1000 g/mol.

Further, preferably, the polyorganosiloxane can have a kinematic viscosity at 25° C. of 1 to 1000 res. Specifically, the polyorganosiloxane has a kinematic viscosity ($mm^2$/s) at 25° C. of 10 or more, 20 or more, 30 or more, 40 or more, or 50 or more. In addition, the kinematic viscosity ($mm^2$/s) at 25 CC may be 500 or less, 400 or less, 300 or less, 250 or less, or 200 or less. In the case of using a polyorganosiloxane having the kinematic viscosity in the above-mentioned range, defective molding due to gas generation can be prevented during molding, while facilitating dispersion in the copolycarbonate and the polycarbonate described above.

Further, in the polycarbonate composition, the flame retardant may be contained in an amount of 0.05 to 1.0 parts by weight, preferably 0.1 to 0.8 parts by weight, based on 100 parts by weight of the total of the copolycarbonate and the polycarbonate. Within the above range, it is possible to impart the effect of improving flame retardancy while maintaining the properties of transparency and impact strength.

In this case, when two or more flame retardants are used, the flame retardants may each be independently contained in an amount of 0.01 to 0.5 parts by weight, preferably 0.05 to 0.4 parts by weight, based on 100 parts by weight of the total of the copolycarbonate and the polycarbonate.

Organophosphorus Compound (d)

In the present invention, an organophosphorus compound is used in addition to the above-described copolycarbonate, polycarbonate, and flame retardant, thereby improving the flame retardancy of the polycarbonate composition and also maintaining excellent impact resistance even under high temperature and high humidity conditions. The term 'organophosphorus compound' according to the present invention means a compound in which a phosphorus atom is bonded to at least one organic group.

According to one embodiment of the present invention, in comparison with the polycarbonate composition according to the comparative example using only one of the flame retardant (c) and the organophosphorus compound (d), the polycarbonate composition according to the example using both of them showed that the flame retardant ratings as measured for test specimens having thicknesses of 1.5 mm and 3.0 mm in accordance with UL-94 standard were all V-O.

Furthermore, it was confirmed that the polycarbonate composition according to the above example has excellent low-temperature impact strength as measured in accordance with ASTM D256 (⅛ inch, Notched Izod), and also remarkably improved the room-temperature impact strength maintenance rate under severe conditions of high temperature and high humidity.

Specifically, the organophosphorus compound may be a cyclic organophosphorus compound having a ring containing a phosphorus atom. For example, the organophosphorus compound may be a phosphinate-based organophosphorus compound.

Preferably, the organophosphorus compound may include a phosphaphenanthrene-based compound represented by the following Chemical Formula 5.

[Chemical Formula 5]

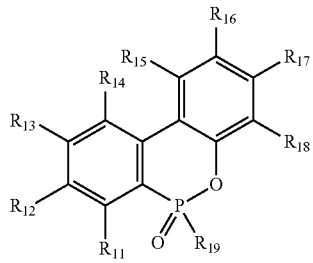

In Chemical Formula 5, $R_{11}$ to $R_{19}$ are each independently hydrogen, a $C_{1-20}$ alkyl, or a $C_{1-20}$ aryl.

In Chemical Formula 5, preferably, $R_{11}$ to $R_{19}$ are each independently hydrogen, a $C_{1-10}$ alkyl, or a $C_{1-10}$ aryl, more preferably, hydrogen, methyl, or phenyl, and most preferably hydrogen.

For example, the organophosphorus compound may include a compound represented by the following Chemical Formula 5-1.

[Chemical Formula 5-1]

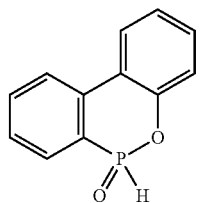

In addition, in the polycarbonate composition, the organophosphorus compound may be contained in an amount of 0.01 to 0.2 parts by weight, preferably 0.02 to 0.1 parts by weight, based on 100 parts by weight of the total of the copolycarbonate and the polycarbonate. Within the above range, it is possible to improve the impact strength maintenance rate under high temperature and high humidity while further improving the flame retardancy of the polycarbonate composition.

Polycarbonate Composition

The polycarbonate composition according to the present invention includes (a) the above-described copolycarbonate, (b) at least one polycarbonate selected from the group consisting of a non-branched polycarbonate and a branched polycarbonate, (c) at least one flame retardant selected from the group consisting of a sulfonate-based metal salt and a polyorganosiloxane, and (d) an organophosphorus compound.

Thereby, the polycarbonate composition exhibits excellent flame retardancy and impact strength, and can maintain such impact strength even under high temperature and high humidity conditions. In particular, the polycarbonate composition can be excellent not only in room temperature impact strength but also in low-temperature impact strength while having excellent flame retardancy.

Specifically, in the polycarbonate composition, the flame retardant ratings as measured for test specimens having thicknesses of 1.5 mm and 3.0 mm according to the UL-94 standard may be all V-O.

Further, the polycarbonate resin composition may have room temperature impact strength of 800 J/m or more, as measured at 23° C. in accordance with ASTM 0256 (⅛ inch, Notched Izod). Preferably, the room temperature impact strength is 810 J/m or more, 820 J/m or more, 830 J/m or more, or 840 J/m or more. Further, the higher the value of the room temperature impact strength, the better it is. Thus, the upper limit thereof is not limited, but it may be, for example, 950 J/m or less, 940 J/m or less, 930 J/m or less, 920 J/m or less, 910 J/m or less, or 900 J/m or less.

At the same time, the polycarbonate composition can have low temperature impact strength of 600 J/m or more as measured at −30° C. in accordance with ASTM 0256 (⅛ inch, Notched Izod). Preferably, the low-temperature impact strength is 650 J/m or more, 700 J/m or more, 710 J/m or more, 720 J/m or more, or 730 J/m or more. Further, the higher the value of the low-temperature impact strength is, the better it is. Thus, the upper limit thereof is not limited, but it may be, for example, 900 J/m or less, 880 J/m or less, 860 J/m or less, 840 J/m or less, 820 J/m or less, 810 J/m or less, or 800 J/m or less.

Meanwhile, the present invention provides an article including the above-mentioned polycarbonate composition.

Preferably, the above article is an injection molded article. In addition, the article may further include, for example, one or more selected from the group consisting of antioxidants, heat stabilizers, light stabilizers, plasticizers, antistatic agents, nucleating agents, flame retardants, lubricants, impact reinforcing agents, fluorescent whitening agent, ultraviolet absorbers, pigments, and dyes.

The method for preparing the article may include the steps of mixing the copolycarbonate according to the present invention and additives such as antioxidants using a mixer, extrusion-molding the mixture with an extruder to produce a pellet, drying the pellet, and then injecting the dried pellet with an injection molding machine.

Advantageous Effects

The polycarbonate composition according to the present invention includes a copolycarbonate having a specific siloxane structure and a branched or non-branched polycarbonate, and simultaneously uses a flame retardant and an organophosphorus compound, thereby being able to exhibit excellent flame retardancy and impact strength and also to maintain the impact strength even under high temperature and high humidity conditions for a long period of time.

DETAILED DESCRIPTION OF THE EMBODIMENTS

Preferred embodiments will be provided below in order to assist in the understanding of the present disclosure. However, these examples are provided only for illustration of the present invention, and should not be construed as limiting the present invention to these examples.

Materials Used

The following materials were used in examples and comparative examples below.

(a) Copolycarbonate Resin

LUPOY PC 8000-10 manufactured by LG Chem. Ltd., which is a copolycarbonate having a weight average molecular weight of 26,500 g/mol and containing repeating units of Chemical Formulae 1-1, 2-2, and 3-2, was used.

(b-1) Non-Branched Polycarbonate Resin

LUPOY PC 1300-10 manufactured by LG Chem. Ltd., which is a polycarbonate having a weight average molecular weight of 30,300 g/mol and containing a repeating unit represented by Chemical Formula 1-1, was used.

(b-2) Branched Polycarbonate Resin

LUPOY PC 1600-03 manufactured by LG Chem. Ltd., which is a polycarbonate having a weight average molecular weight of 37,500 g/mol and containing repeating units represented by Chemical Formulae 1-1 and 4-2, was used.

(c-1) Polyorganosiloxane

KR-511 manufactured by Shin-Etsu, Japan, which is a silicone oligomer having a methoxy group content of 13 wt %, a vinyl equivalent weight of 530 g/mol, and a kinematic viscosity (25° C.) of 100 mm'/s, in which the terminal is substituted with methoxy and the side chain is substituted with a methoxy group, phenyl group, and vinyl group, was used.

(c-2) Sulfonate-Based Metal Salt

RM65 manufactured by Miteni, which is potassium perfluorobutane sulfonate (KPFBS), was used.

(c-3) Sulfonate-Based Metal Salt

KSS-FR manufactured by Arichem, which is potassium diphenylsulfone sulfonate (KSS), was used.

(d) Organophosphorus Compound

HCA manufactured by SANKO, which is 9,10-dihydro-9-oxa-phosphaphenanthrene-10-oxide represented by the following Chemical Formula 5-1, was used.

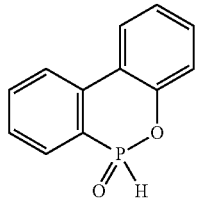

[Chemical Formula 5-1]

Examples and Comparative Examples

After mixing the contents of the respective components as shown in Tables 1 and 2 below, the mixture was pelletized at a rate of 80 kg per hour in a twin-screw extruder (L/D=36, ϕ=45, barrel temperature: 240° C.), and then subjected to injection molding using a JSW N-20C injection molding machine at a cylinder temperature of 300° C. and a mold temperature of 80° C. to prepare a specimen.

TABLE 1

|  |  | Example 1 | Example 2 | Example 3 | Example 4 |
|---|---|---|---|---|---|
| Copolycarbonate (wt %) | a | 80 | 80 | 80 | 70 |
| Polycarbonate (wt %) | b-1 | 20 | — | 20 | 30 |
|  | b-2 | — | 20 | — | — |
| Flame retardant (phr)[1] | c-1 | 0.3 | 0.3 | — | 0.3 |
|  | c-2 | 0.1 | 0.1 | 0.1 | 0.1 |
|  | c-3 | — | — | 0.2 | — |
| Organophosphorus compound (phr)[1] | d | 0.03 | 0.03 | 0.03 | 0.08 |

[1])Parts by weight based on 100 parts by weight of the total of copolycarbonate and polycarbonate

TABLE 2

|  |  | Comparative Example 1 | Comparative Example 2 | Comparative Example 3 | Comparative Example 4 | Comparative Example 5 |
|---|---|---|---|---|---|---|
| Copolycarbonate (wt %) | a | 80 | 80 | 80 | — | — |
| Polycarbonate (wt %) | b-1 | 20 | 20 | 20 | 100 | — |
|  | b-2 | — | — | — | — | 100 |
| Flame retardant (phr)[1] | c-1 | 0.3 | — | — | 0.3 | 0.3 |
|  | c-2 | 0.1 | — | — | 0.1 | 0.1 |
|  | c-3 | — | 0.5 | — | — | — |
| Organophosphorus compound (phr)[1] | d | — | — | 0.2 | 0.03 | 0.03 |

[1])Parts by weight based on 100 parts by weight of the total of copolycarbonate and polycarbonate Physical properties of the above prepared specimens were measured by the following methods.

1) Weight average molecular weight (Mw): measured by GPC using PC standard with Agilent 1200 series.

2) Melt Index (MI): measured in accordance with ASTM D1238 (conditions of 300° C. and 1.2 kg).

3) Haze: measured using a haze meter in accordance with ASTM 1003.

4) Room temperature impact strength: measured at 23° C. in accordance with ASTM D256 (⅛ inch, Notched Izod).

5) Low-temperature impact strength: measured at −30° C. in accordance with ASTM 0256 (⅛ inch, Notched Izod).

6) Impact strength maintenance rate: According to IEC 60068-2-78, the impact strength maintenance rate was determined by leaving ⅛-inch specimens for measuring impact strength under the conditions of 85° C. and 85% humidity, taking out the specimens after 250 hours to measure the room temperature impact strength, dividing the resultant value by the value of the initial room temperature impact strength before being left, and then multiplying it by 100.

7) Flame retardancy: The flame retardancy was evaluated according to the UL 94V standard. Specifically, five retardant specimens with a thickness of 3.0 mm required for the application of the retardant test and five retardant specimens with a thickness of 1.5 mm were prepared, and the evaluation was conducted according to the following procedure.

First, a 20 mm high flame was applied to the specimen for 10 seconds and then the combustion time (t1) of the specimen was measured, and the combustion process was recorded. Then, if burning ceases after the first flame application, the flame is reapplied for an additional 10 seconds. The combustion time (t2) and the glowing time (t3) were measured and the combustion process was recorded. These were similarly applied to the five specimens and the evaluation was conducted according to the criteria shown in Table 3 below.

TABLE 3

| Flame retardant rating | V-0 | V-1 | V-2 |
|---|---|---|---|
| Individual combustion time (t1 or t2 of individual specimens) | Below 10 seconds | Below 30 seconds | Below 30 seconds |
| Total combustion time of five specimens (total sum of t1 and t2 of five specimens) | Below 50 seconds | Below 250 seconds | Below 250 seconds |
| Combustion and glowing time after second flame application (sum of t2 and t3 of individual specimens) | Below 30 seconds | Below 60 seconds | Below 60 seconds |
| Whether the specimens drip flaming particles | Not drip | Not drip | Not drip |

The measurement results of the physical properties of the examples and comparative examples are shown in Tables 4 and 5 below.

TABLE 4

|  | Example 1 | Example 2 | Example 3 | Example 4 |
|---|---|---|---|---|
| Mw (g/mol) | 29,540 | 31,740 | 29,540 | 29,160 |
| Ml (g/10 min) | 10.2 | 8.9 | 10.5 | 10.1 |
| Haze (%) | 0.3 | 0.5 | 0.4 | 0.3 |
| Room temperature impact strength (J/m) | 854 | 889 | 843 | 827 |
| Low-temperature impact strength (J/m) | 735 | 760 | 735 | 687 |
| Impact strength maintenance rate (%) | 84.1 | 90.9 | 71.8 | 74.7 |
| UL-94 @3.0 mm | V-0 | V-0 | V-0 | V-0 |
| UL-94 @1.5 mm | V-0 | V-0 | V-0 | V-0 |

TABLE 5

|  | Comparative Example 1 | Comparative Example 2 | Comparative Example 3 | Comparative Example 4 | Comparative Example 5 |
|---|---|---|---|---|---|
| Mw (g/mol) | 29,540 | 29,540 | 29,540 | 26,500 | 37,500 |
| Ml (g/10 min) | 10.1 | 10.8 | 10.2 | 9.5 | 3.0 |
| Haze (%) | 0.3 | 0.6 | 0.4 | 0.2 | 0.3 |
| Room temperature impact strength (J/m) | 858 | 819 | 846 | 884 | 942 |
| Low-temperature impact strength (J/m) | 703 | 724 | 731 | 194 | 360 |
| Impact strength maintenance rate (%) | 86.2 | 15.0 | 36.5 | 12.7 | 24.3 |
| UL-94 @3.0 mm | V-0 | V-0 | V-1 | V-1 | V-1 |
| UL-94 @1.5 mm | V-1 | V-0 | V-2 | Fail | V-1 |

As shown in Tables 4 and 5 above, it was confirmed that in the case of the examples according to the present invention, the low-temperature impact strength and the flame retardancy were superior, and also the impact strength maintenance rate was greatly improved, as compared with the comparative examples.

Therefore, it was confirmed that the polycarbonate composition according to the present invention simultaneously includes a copolycarbonate containing a specific siloxane structure and a polycarbonate, and additionally uses a flame retardant and an organophosphorus compound as additives, thereby being able to have high impact strength and excellent flame retardancy and also maintain the impact strength even under high temperature and high humidity conditions.

The invention claimed is:
1. A polycarbonate composition comprising:
   (a) a copolycarbonate containing an aromatic polycarbonate-based first repeating unit and an aromatic polycarbonate-based second repeating unit having at least one siloxane bond;
   (b) at least one polycarbonate selected from the group consisting of a non-branched polycarbonate containing an aromatic polycarbonate-based first repeating unit, and a branched polycarbonate containing an aromatic polycarbonate-based first repeating unit and a trivalent or tetravalent branched repeating unit which links a plurality of the first repeating units;

(c) a flame retardant which includes at least two sulfonate-based metal salts, or at least one sulfonate-based metal salt and at least one polyorganosiloxane; and (d) an organophosphorus compound, wherein the first repeating units each independently include a repeating unit represented by the following Chemical Formula 1, wherein the second repeating unit includes a repeating unit represented by the following Chemical Formula 2, and a repeating unit represented by the following Chemical Formula 3, and wherein the sulfonate-based metal salt is selected from the group consisting of sodium trifluoromethyl sulfonate, sodium perfluoroethyl sulfonate, sodium perfluorobutyl sulfonate, sodium perfluoroheptyl sulfonate, sodium perfluorooctyl sulfonate, sodium trichlorobenzene sulfonate, sodium polystyrene sulfonate, potassium perfluorobutyl sulfonate, potassium perfluorohexyl sulfonate, potassium perfluorooctyl sulfonate, calcium perfluoromethane sulfonate, rubidium perfluorobutyl sulfonate, rubidium perfluorohexyl sulfonate, cesium trifluoromethyl sulfonate, cesium perfluoroethyl sulfonate, cesium perfluorohexyl sulfonate, and cesium perfluorooctyl sulfonate:

[Chemical Formula 1]

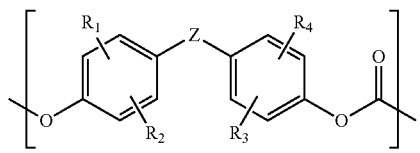

wherein, in Chemical Formula 1, $R_1$ to $R_4$ are each independently hydrogen, a $C_{1-10}$ alkyl, a $C_{1-10}$ alkoxy, or a halogen, and Z is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO;

[Chemical Formula 2]

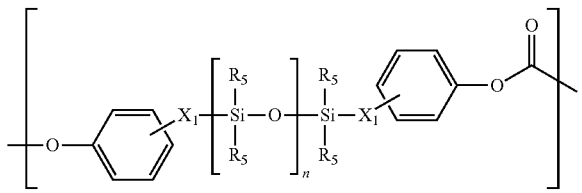

wherein, in Chemical Formula 2, each $X_1$ is independently a $C_{1-10}$ alkylene, each $R_5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and n is an integer of 1 to 200,

[Chemical Formula 3]

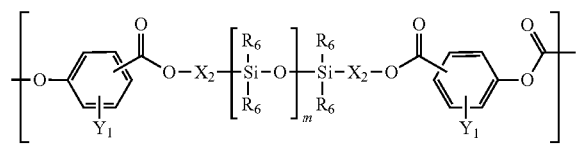

wherein, in Chemical Formula 3, each $X_2$ is independently a $C_{1-10}$ alkylene, each $Y_1$ is independently hydrogen, a $C_{1-6}$ alkyl, a halogen, a hydroxy, a $C_{1-6}$ alkoxy, or a $C_{6-20}$ aryl, each $R_6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and m is an integer of 1 to 200.

2. The polycarbonate composition of claim 1, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

3. The polycarbonate composition of claim 1, wherein the repeating unit represented by Chemical Formula 1 is represented by the following Chemical Formula 1-1:

[Chemical Formula 1-1]

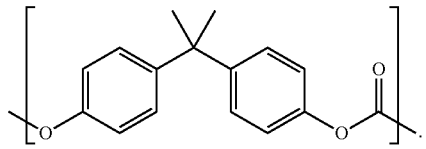

4. The polycarbonate composition of claim 1, wherein the repeating unit represented by Chemical Formula 2 is represented by the following Chemical Formula 2-2:

[Chemical Formula 2-2]

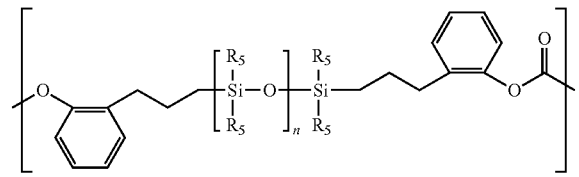

wherein, in Chemical Formula 2-2, $R_5$ and n are the same as defined in claim 1.

5. The polycarbonate composition of claim 1, wherein the repeating unit represented by Chemical Formula 3 is represented by the following Chemical Formula 3-2:

[Chemical Formula 3-2]

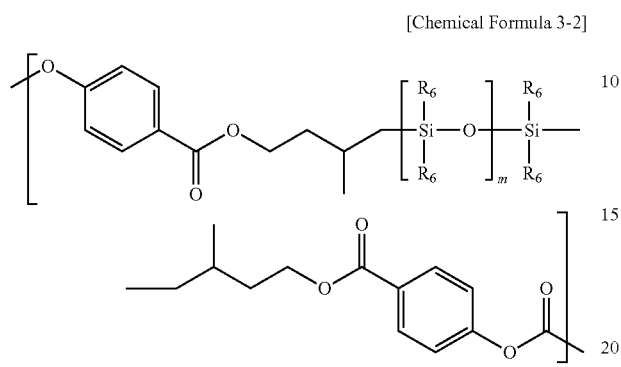

wherein, in Chemical Formula 3-2, $R_6$ and m are the same as defined in claim 1.

6. The polycarbonate composition of claim 1, wherein n is an integer of 10 to 50, and m is an integer of 40 to 100.

7. The polycarbonate composition of claim 1, wherein the weight ratio between the repeating unit represented by Chemical Formula 2 and the repeating unit represented by Chemical Formula 3 is 1:99 to 99:1.

8. The polycarbonate composition of claim 1, wherein the copolycarbonate has a weight average molecular weight of 1000 to 100,000 g/mol.

9. The polycarbonate composition of claim 1, wherein the trivalent or tetravalent branched repeating unit is a repeating unit represented by the following Chemical Formula 4:

[Chemical Formula 4]

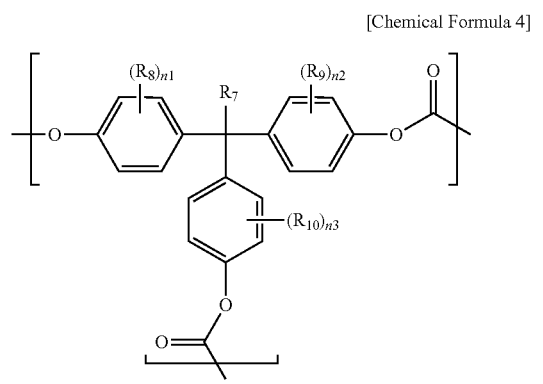

wherein, in Chemical Formula 4,
$R_7$ is hydrogen, a $C_{1-10}$ alkyl, or

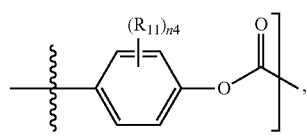

$R_6$ to $R_9$ are each independently hydrogen, a $C_{1-10}$ alkyl, halogen, a $C_{1-10}$ alkoxy, an allyl, a $C_{1-10}$ haloalkyl, or a $C_{6-29}$ aryl, and
n1 to n4 are each independently an integer of 1 to 4.

10. The polycarbonate composition of claim 9, wherein the repeating unit represented by Chemical Formula 4 is represented by the following Chemical Formula 4-2 or Chemical Formula 4-3:

[Chemical Formula 4-2]

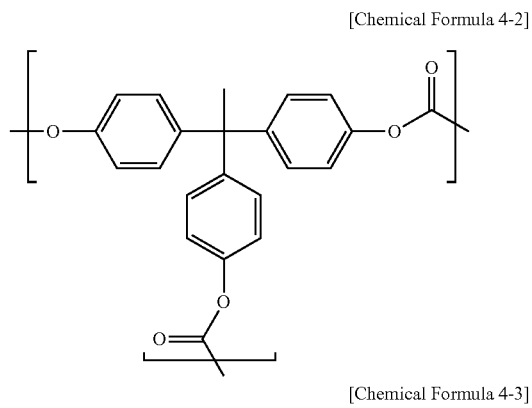

[Chemical Formula 4-3]

11. The polycarbonate composition of claim 1, wherein the weight ratio between the repeating unit represented by Chemical Formula 1 and the branched repeating unit is 1:0.001 to 1:0.1.

12. The polycarbonate composition of claim 1, wherein the non-branched polycarbonate and the branched polycarbonate each independently have a weight average molecular weight of 1000 to 100,000 g/mol.

13. The polycarbonate composition of claim 1, wherein the branched and non-branched polycarbonates are those in which a polysiloxane structure is not introduced in the main chain of the polycarbonate.

14. The polycarbonate composition of claim 1, wherein the weight ratio between the copolycarbonate and the polycarbonate is 1:99 to 99:1.

15. The polycarbonate composition of claim 1, wherein the polyorganosiloxane is a silicone polymer including at least one substituent selected from the group consisting of alkyl, aryl, alkoxy, aryloxy, vinyl, (meth)acrylate, epoxy, mercapto, silanol, and amino.

16. The polycarbonate composition of claim 1, wherein the flame retardant is contained in an amount of 0.05 to 1.0 parts by weight, based on 100 parts by weight of the total of the copolycarbonate and the polycarbonate.

17. The polycarbonate composition of claim 1, wherein the organophosphorus compound includes a compound represented by the following Chemical Formula 5:

[Chemical Formula 5]

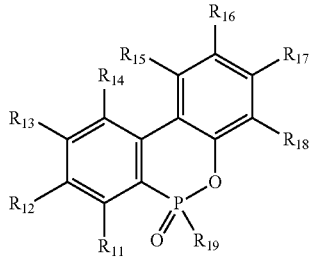

wherein, in Chemical Formula 5,
$R_{11}$ to $R_{19}$ are each independently hydrogen, a $C_{1-20}$ alkyl, or a $C_{1-20}$ aryl.

18. The polycarbonate composition of claim 1, wherein the organophosphorus compound is contained in an amount of 0.01 to 0.2 parts by weight, based on 100 parts by weight of the total of the copolycarbonate and the polycarbonate.

19. An article comprising the polycarbonate composition of claim 1.

20. The polycarbonate composition of claim 1, wherein the sulfonate-based metal salt further includes potassium diphenylsulfone sulfonate provided that the flame retardant includes at least two sulfonate-based metal salts.

* * * * *